US012675814B2

(12) United States Patent
Li et al.

(10) Patent No.: US 12,675,814 B2
(45) Date of Patent: Jul. 7, 2026

(54) METHOD, APPARATUS, DEVICE, STORAGE MEDIUM AND PROGRAM PRODUCT FOR OBJECT DETERMINATION

(71) Applicant: Beijing Youzhuju Network Technology Co., Ltd., Beijing (CN)

(72) Inventors: Songsong Li, Beijing (CN); Shaoxun Lu, Beijing (CN); Xu Zhao, Beijing (CN); Siyuan Feng, Beijing (CN); Enlu Lin, Beijing (CN); Jun Zhang, Beijing (CN)

(73) Assignee: Beijing Youzhuju Network Technology Co., Ltd., Beijing (CN)

( * ) Notice: Subject to any disclaimer, the term of this patent is extended or adjusted under 35 U.S.C. 154(b) by 323 days.

(21) Appl. No.: 18/555,089

(22) PCT Filed: Apr. 7, 2022

(86) PCT No.: PCT/CN2022/085592
§ 371 (c)(1),
(2) Date: Oct. 12, 2023

(87) PCT Pub. No.: WO2022/228074
PCT Pub. Date: Nov. 3, 2022

(65) Prior Publication Data
US 2024/0202800 A1     Jun. 20, 2024

(30) Foreign Application Priority Data
Apr. 30, 2021     (CN) .......................... 202110484259.8

(51) Int. Cl.
*G06Q 30/00*      (2023.01)
*G06Q 30/0201*     (2023.01)
*G06Q 30/0601*     (2023.01)

(52) U.S. Cl.
CPC ..... *G06Q 30/0631* (2013.01); *G06Q 30/0201* (2013.01); *G06Q 30/0641* (2013.01)

(58) Field of Classification Search
CPC ................................................. G06Q 30/06–08
See application file for complete search history.

(56) References Cited

U.S. PATENT DOCUMENTS

| | | | | |
|---|---|---|---|---|
| 10,891,680 B1 * | 1/2021 | Bowman | ............... | H04W 4/029 |
| 2009/0271275 A1 * | 10/2009 | Regmi | ............... | G06Q 30/0245 |
| | | | | 705/14.73 |

(Continued)

FOREIGN PATENT DOCUMENTS

| | | |
|---|---|---|
| CN | 103514209 A | 1/2014 |
| CN | 107562818 A | 1/2018 |

(Continued)

OTHER PUBLICATIONS

China National Intellectual Property Administration, Notice of Allowance Issued in Application No. 202110484259.8, Jan. 23, 2024, 6 pages.

(Continued)

*Primary Examiner* — Ethan D Civan
(74) *Attorney, Agent, or Firm* — Alleman Hall LLP

(57) ABSTRACT

According to the embodiments of the present disclosure, a method, an apparatus, a device, a storage medium and a program product for object determination are provided. The method includes: recalling, from a set of objects, a plurality of candidate objects for a target promoter, the promoter being capable of publishing a guidance content for guiding a user to acquire a corresponding object; determining, based on a first feature of the target promoter and second features of the plurality of candidate objects, priority levels of the plurality of candidate objects; and determining, based on the (Continued)

priority levels, a target object for the target promoter from the plurality of candidate objects.

20 Claims, 3 Drawing Sheets

(56) References Cited

U.S. PATENT DOCUMENTS

| | | | | |
|---|---|---|---|---|
| 2017/0098236 A1* | 4/2017 | Lee | | G06Q 10/067 |
| 2019/0311418 A1* | 10/2019 | Pandit | | G06Q 50/01 |
| 2022/0197963 A1* | 6/2022 | Kincl | | G06Q 30/0643 |
| 2024/0202769 A1* | 6/2024 | Li | | G06Q 30/0243 |

FOREIGN PATENT DOCUMENTS

| | | |
|---|---|---|
| CN | 108073670 A | 5/2018 |
| CN | 108540860 A | 9/2018 |
| CN | 109190043 A | 1/2019 |
| CN | 109241242 A | 1/2019 |
| CN | 109379608 A | 2/2019 |
| CN | 109769128 A | 5/2019 |
| CN | 110020921 A | 7/2019 |
| CN | 110990695 A | 4/2020 |
| CN | 107666615 B | 5/2020 |
| CN | 111241388 A | 6/2020 |
| CN | 111757130 A | 10/2020 |
| CN | 112053184 A | 12/2020 |
| CN | 112100507 A | 12/2020 |
| CN | 112100558 A | 12/2020 |
| CN | 112118489 A | 12/2020 |
| CN | 112232915 A | 1/2021 |
| CN | 112307344 A | 2/2021 |
| CN | 112579909 A | 3/2021 |
| CN | 113205362 A | 8/2021 |
| CN | 113205382 A | 8/2021 |

OTHER PUBLICATIONS

Du, D., "Research on Personalized Recommendation Method of Live Broadcast Platform Based on RFM Model," Dissertation, South China University of Technology, Jun. 3, 2020, 74 pages.
Yibang Power Network, "The star map is equipped with an "expert recommendation assistant": the anchors that merchants need can be customized.", ebrun, Available Online at m.ebrun.com/375428. html, Feb. 28, 2020, 10 pages.
"How can Taobao sellers find an anchor to listen to the voice?," Baidu, Available Online at jingyan.baidu.com/article/ 3f16e003aaeb2e6491c10394.html, Mar. 22, 2020, 12 pages.
China National Intellectual Property Administration, Office Action and Search Report Issued in Application No. 202110484259.8, Feb. 11, 2023, 10 pages.
ISA China National Intellectual Property Administration, International Search Report Issued in Application No. PCT/CN2022/ 085592, Jun. 23, 2022, WIPO, 14 pages.

* cited by examiner

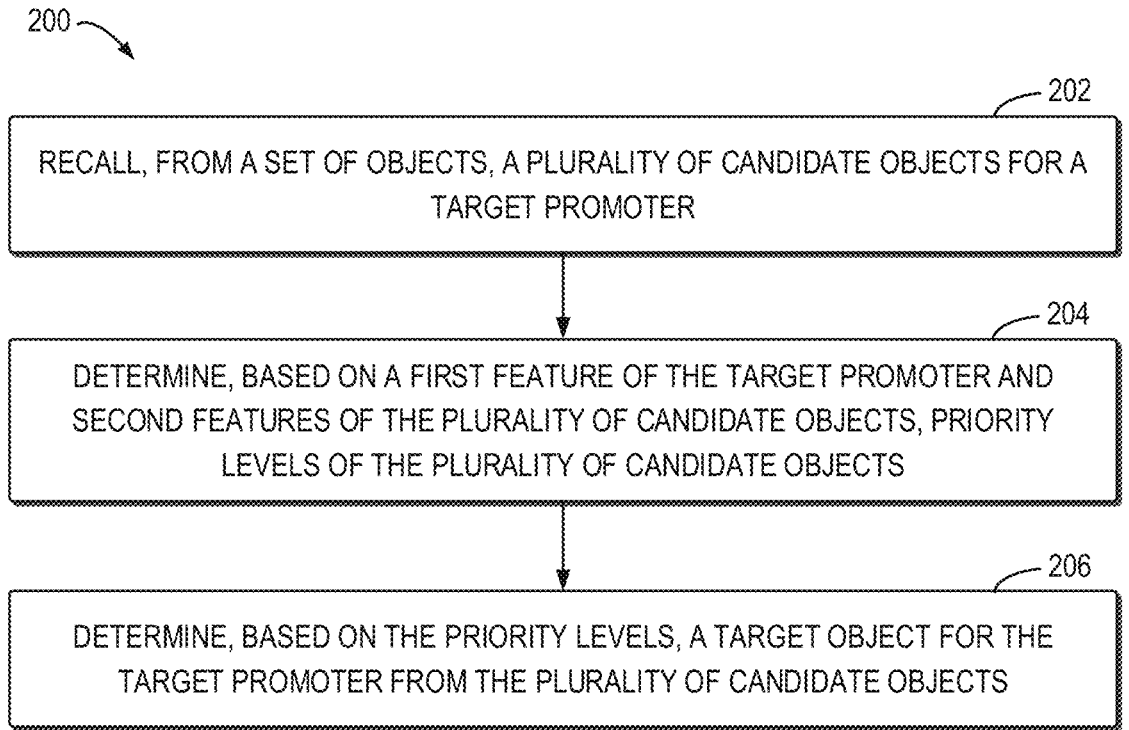

200

202

RECALL, FROM A SET OF OBJECTS, A PLURALITY OF CANDIDATE OBJECTS FOR A TARGET PROMOTER

204

DETERMINE, BASED ON A FIRST FEATURE OF THE TARGET PROMOTER AND SECOND FEATURES OF THE PLURALITY OF CANDIDATE OBJECTS, PRIORITY LEVELS OF THE PLURALITY OF CANDIDATE OBJECTS

206

DETERMINE, BASED ON THE PRIORITY LEVELS, A TARGET OBJECT FOR THE TARGET PROMOTER FROM THE PLURALITY OF CANDIDATE OBJECTS

FIG. 2

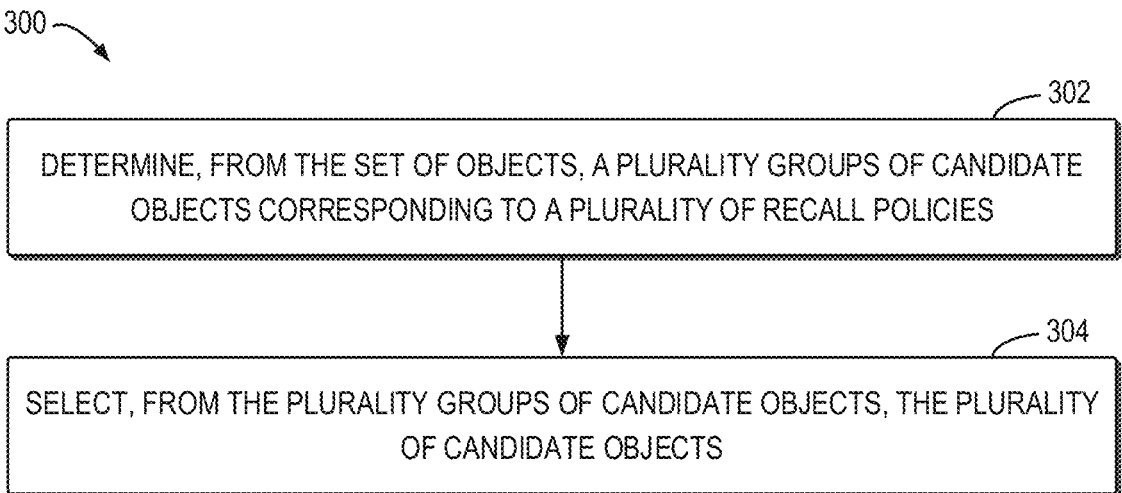

300

302

DETERMINE, FROM THE SET OF OBJECTS, A PLURALITY GROUPS OF CANDIDATE OBJECTS CORRESPONDING TO A PLURALITY OF RECALL POLICIES

304

SELECT, FROM THE PLURALITY GROUPS OF CANDIDATE OBJECTS, THE PLURALITY OF CANDIDATE OBJECTS

METHOD, APPARATUS, DEVICE, STORAGE MEDIUM AND PROGRAM PRODUCT FOR OBJECT DETERMINATION

CROSS-REFERENCE TO RELATED APPLICATIONS

This application is a national stage of the International application PCT/CN2022/085592, filed on Apr. 7, 2022. This International application claims priority to Chinese Patent Application No. 202110484259.8, filed on Apr. 30, 2021. All of these applications are hereby incorporated by reference in their entireties.

TECHNICAL FIELD

Various embodiments of the present disclosure relate to the field of computers, and in particular to a method, an apparatus, a device, and a computer storage medium for object determination.

BACKGROUND

With the development of information technology, people may encounter various guidance contents in their daily lives, for example, texts, video advertisements, live streaming sales, or the like. These guidance contents may guide people to acquire corresponding objects. Such objects, for example, may comprise tangible goods, digital contents, specific services, or the like.

A large number of providers (for example, stores or service providers, and so on) expect to collaborate with promoters to promote better understanding of objects by users or guide more users to acquire these objects. However, for a promoter, a significant amount of time and manpower costs are needed to select a suitable object that meets its needs from a large number of objects. Therefore, how to effectively determine a suitable object for a provider has become a focus of attention.

SUMMARY

In a first aspect of the present disclosure, a method of object determination is provided. The method comprises: recalling, from a set of objects, a plurality of candidate objects for a target promoter, the promoter being capable of publishing a guidance content for guiding a user to acquire a corresponding object; determining, based on a first feature of the target promoter and second features of the plurality of candidate objects, priority levels of the plurality of candidate objects; and determining, based on the priority levels, a target object for the target promoter from the plurality of candidate objects.

In a second aspect of the present disclosure, an apparatus for object determination is provided. The apparatus comprises: a recalling unit configured to recall, from a set of objects, a plurality of candidate objects for a target promoter, the promoter being capable of publishing a guidance content for guiding a user to acquire a corresponding object; an ordering unit configured to determine, based on a first feature of the target promoter and second features of the plurality of candidate objects, priority levels of the plurality of candidate objects; and a determining unit configured to determine, based on the priority levels, a target object for the target promoter from the plurality of candidate objects.

In a third aspect of the present disclosure, an electronic device is provided. The device comprises a memory and a processor; the memory is used to store one or more computer instructions, and the one or more computer instructions are executed by the processor to implement the method of the first aspect.

In a fourth aspect of the present disclosure, a computer-readable storage medium is provided. The medium has one or more computer instructions stored thereon which, when executed by a processor, implements the method of the first aspect.

In a fifth aspect of the present disclosure, a computer program product is provided. The computer program product comprises one or more computer instructions, which are executed by a processor to implement the method of the first aspect.

BRIEF DESCRIPTION OF THE DRAWINGS

The above and other features, advantages and aspects of the embodiments of the present disclosure will become more apparent in combination with the accompanying drawings and with reference to the following detailed description. In the drawings, the same or similar reference symbols refer to the same or similar elements, where:

FIG. 2 shows a flowchart of an example process for object determination according to some embodiments of the present disclosure;

FIG. 3 shows a flowchart of an example process for recalling candidate objects according to some embodiments of the present disclosure;

DETAILED DESCRIPTION

Figure 1:
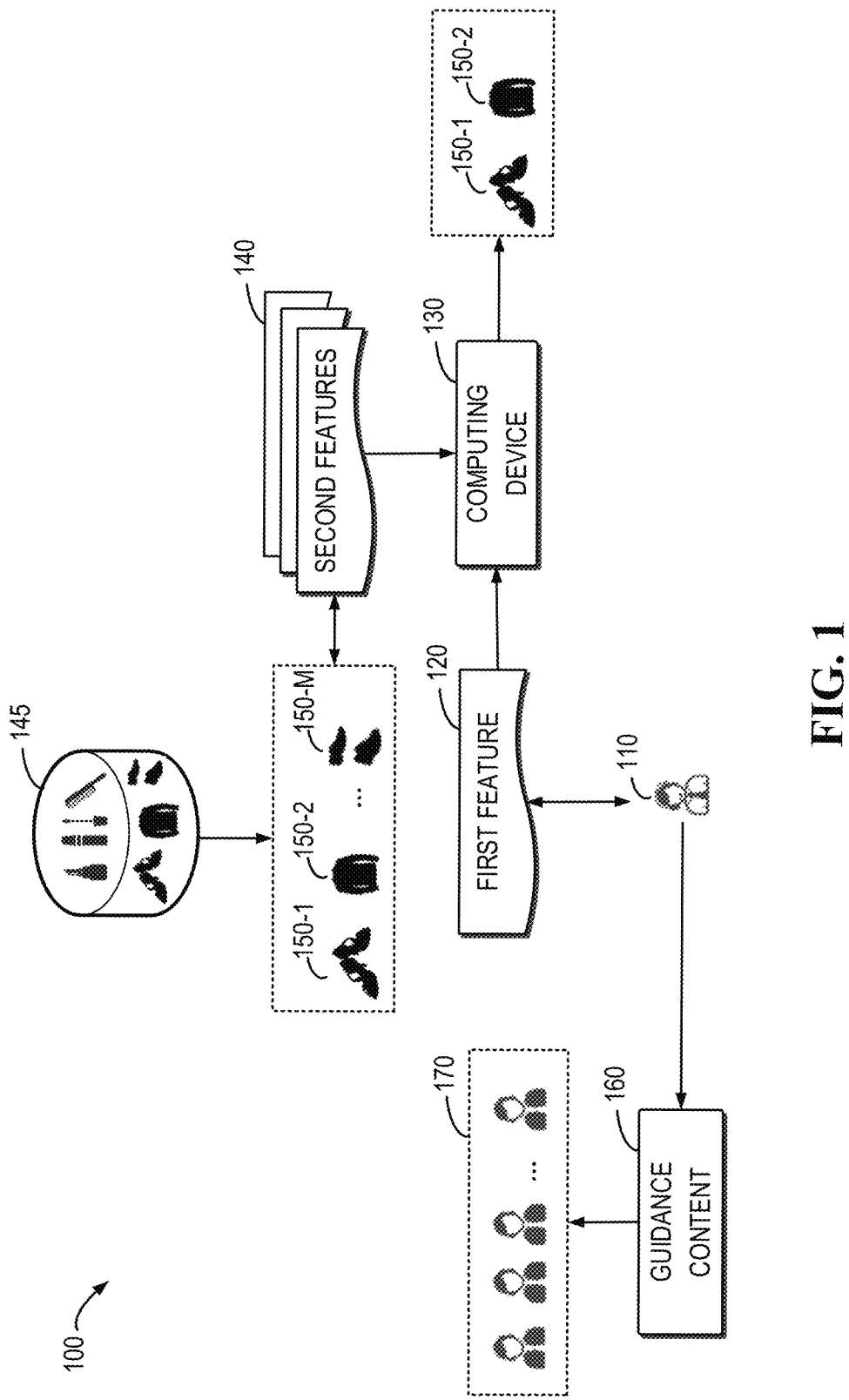
FIG. 1 shows a schematic diagram of an example environment in which multiple embodiments of the present disclosure can be implemented.

The embodiments of the present disclosure will be described in more detail below with reference to the accompanying drawings. Although some embodiments of the present disclosure are shown in the drawings, it would be appreciated that the present disclosure can be implemented in various forms and should not be interpreted as limited to the embodiments described herein. On the contrary, these embodiments are provided for a more thorough and complete understanding of the present disclosure. It would be appreciated that the drawings and embodiments of the present disclosure are only for illustrative purposes and are not intended to limit the scope of protection of the present disclosure.

In the description of the embodiments of the present disclosure, the term "including" and similar terms should be understood as open inclusion, that is, "including but not limited to". The term "based on" should be understood as "at least partially based on". The term "one embodiment" or "the embodiment" should be understood as "at least one embodiment". The term "some embodiments" should be understood as "at least some embodiments". Other explicit and implicit definitions may also be included below.

As discussed above, an increasing number of providers expect to guide users to acquire objects provided by the providers through collaboration with promoters. For example, some merchants may collaborate with some live streamers and guide users to purchase products sold by the merchants through contents of live streaming.

However, with the rapid development of the live streaming industry, some live streamers usually have to spend a large amount of time selecting a suitable product suitable for themselves. This will consume live streamers a significant amount of time and labor costs.

It can be seen that current solutions can hardly effectively determine for the provider an object that meets its needs.

In order to at least partially address one or more of aforementioned issues and other potential issues, example embodiments of the present disclosure propose a scheme for object determination. Overall, according to the embodiments described herein, a plurality of candidate objects (for example, tangible products, digital contents or specific services, and so on) for a target promoter (for example, a live streamer, a video creator, a text content creator, and so on) may be recalled from a set of objects. The target promoter may publish a guidance content (for example, a live streaming content, a video file, an online article, and so on) to guide users to acquire corresponding object.

Subsequently, the priority levels of the plurality of candidate objects may be determined based on the first feature of the target provider and the second feature of the plurality of candidate objects, and the target object for the target promoter may be determined from the plurality of candidate objects based on the priority levels. According to the embodiments of the present disclosure, an object that is more in line with the needs of the target promoter may be efficiently determined.

Reference will be made to the accompanying drawings to provide details of embodiments of the present disclosure.

FIG. 1 shows a schematic diagram of an example environment 100 that can be implemented in multiple embodiments of the present disclosure. In this example environment 100, a computing device 130 recalls a plurality of candidate objects 150-1, 150-2, to 150-M (individually or collectively referred to as candidate objects 150) for a target promoter 110 from a set of objects 145. As discussed above, the candidate objects 150 may include tangible products, digital contents, specific services, or the like. Such candidate objects 150, for example, may be provided by a corresponding provider. An example provider may include but is not limited to a physical or virtual store selling products, a news service provider providing news subscription services, a restaurant providing catering services, a music service provider providing music services, and so on.

In the present disclosure, the target promoter 110 may be any individual or organization that is capable of providing a guidance content 160 for guiding a user 170 to acquire a corresponding object. For example, an example promoter may include but is not limited to a live streamer selling products, an author who writes restaurant reviews, a radio program host who provides music sharing contents, a creator who publishes video works, and so on.

The set of objects 145 may include a set of objects that the provider is willing to promote through suitable promoters. Taking a live streaming sales platform as an example, the set of objects 145 may include all products that a merchant expects to sell through a live streamer. The process of recalling the plurality of candidate objects 150 from the set of objects 145 will be described in detail below and will not be discussed in detail here.

As shown in FIG. 1, after recalling the plurality of candidate objects 150, the computing device 130 may determine the priority levels of the plurality of candidate objects based on a first feature 120 of the target promoter 110 and second features 140 of the plurality of candidate objects 150. The process of determining the priority levels based on the first feature 120 and the second features 140 will be described in detail below, and will not be discussed in detail here.

The computing device 130 may further determine target objects (for example, objects 150-1 and 150-2) for the target promoter 110 from the plurality of recalled candidate objects 150 based on the determined priority levels. For example, the computing device 130 may select a candidate object with a priority level exceeding a threshold level from the plurality of candidate objects 150 as a target object. Alternatively, the computing device 130 may also select a predetermined number of target objects with higher priority levels based on a ranking of priority levels.

It should be understood that the numbers of candidate objects and target objects shown in FIG. 1 are only described for purpose of illustration, without suggesting any limitations to the present disclosure.

The process of determining the target object by the computing device 130 is described in detail below with reference to FIG. 2. FIG. 2 shows a flowchart of an example process 200 of object recommendation according to some embodiments of the present disclosure. The process 200 may be implemented, for example, at the computing device 130 in FIG. 1. For the sake of discussion, the process 200 will be described below with reference to a scenario of a merchant and a live streamer. It should be understood that the process 200 may also be applied to other appropriate promoters or objects.

As shown in FIG. 2, at block 202, the computing device 130 recalls a plurality of candidate objects 150 from the set of objects 145 for the target promoter 110. The target promoter 110 is capable of publishing the guidance content 160 for guiding the user 170 to acquire a corresponding object. In the present disclosure, "recall" refers to the process of selecting and acquiring the plurality of candidate objects 150 from the set of objects 145.

Taking the live streaming sales as an example, the computing device 130 may recall and acquire a plurality of candidate products for advertising from the set of products in response to a request from a target live streamer. For example, the computing device 130 may initiate a recall of candidate products in response to the target live streamer logging into a product acquisition page.

In some embodiments, the computing device 130 may utilize one or more predetermined recall policies to recall the plurality of candidate objects 150 from the set of objects 145. In some embodiments, to enrich the results, the computing device 130 may utilize a combination of a plurality of recall policies to recall the plurality of candidate objects 150. The detailed process of recalling a target promoter will be described below with reference to FIG. 3. FIG. 3 shows a flowchart of an example process 300 of recalling promoters according to some embodiments of the present disclosure.

As shown in FIG. 3, at block 302, the computing device 130 may determine, from the set of objects, a plurality groups of candidate objects corresponding to a plurality of recall policies.

In some embodiments, the computing device 130 may utilize a Field-aware Factorization Machines FFM recall policy for recall. Specifically, the computing device 130 may determine a first field vector of the target provider 110 and a second field vector of the set of objects 145 using a trained FFM model, and determine a group of candidate objects base on a distance between the first field vector and the second field vector.

In some embodiments, the FFM model may be trained, for example, based on historical promotion information of the promoter and the objects, so that the promoter and an object that have been promoted by a promoter level have a closer distance in a vector space. On the contrary, the promoter and an object that have not been promoted have a farther distance in the vector space. In this way, the computing device 130 may find an object that is closer to the first field vector of the target promoter 110 in the vector space to be a candidate object.

In other embodiments, the computing device 130 may utilize a collaborative recall policy for recall. Specifically, the computing device 130 may determine, based on a historical guidance content published by the target promoter 110, a historical object associated with the target promoter 110. Subsequently, the computing device 130 may acquire, from the set of objects 145, a group of candidate objects whose differences from the historical object are less than a predetermined threshold.

Taking the live streaming sales as an example, the computing device 130 may determine a historical product that has been promoted by the target merchant, and recall products similar to the historical product as candidate products. For example, in a case that the target merchant has previously advertised cosmetics from a certain brand, the computing device 130 may recall cosmetics from another brand that has a similar customer base.

It should be understood that appropriate methods may be used to determine the differences between objects. Taking products as an example, the differences between products may be based on a product category, a product price, sales volume, product evaluation information, and so on.

In some embodiments, the difference between a historical object and a specific object in the set of objects is determined based on a number of users who have acquired both the historical object and the specific object within a predetermined period of time. Taking the product as an example, in a case that a large quantity of users have purchased product A that was previously advertised by a live streamer during a predetermined period of time, and have also purchased product B that was not advertised by the live streamer, then it can be considered that there is a small difference between product A and product B.

Based on this approach, other objects similar to those that was previously promoted by the target promoter 110 may be recalled.

In some embodiments, the computing device 130 may utilize a contact establishment recall policy for recall. Specifically, the computing device 130 may determine, based on historical contact information, a historical provider that has been contacted by the target promoter 110 previously. The historical provider may provide at least one accessible object to a user. Subsequently, the computing device may determine a group of candidate providers based on the historical provider. The group of candidate providers include the historical provider and an associated provider whose difference from the historical provider is less than a predetermined threshold. The computing device may determine an object that is currently provided by the group of candidate providers as a group of candidate objects.

Taking the live streaming sales as an example, the computing device 130 may acquire a historical merchant that have previously contacted by the target live streamer on the platform, and recall products provided by the historical merchant as candidate products. It should be understood that such a merchant may be a merchant that has previously cooperated with the target live streamer, or may be a merchant that has only contacted with but has not cooperated with the target merchant.

Alternatively, the computing device 130 may further determine an associated merchant similar to the historical merchant. Such an associated merchant may be determined based on attribute information of the associated merchant, for example sales volume, a category of products for sale, a user review, a merchant level, and so on. Furthermore, the computing device 130 may recall products provided by the associated merchant as candidate products.

In some embodiments, the computing device 130 may utilize a preference recall policy for recall. Specifically, the computing device 130 may determine a preference object category of the target promoter 110 based on the historical guidance content published by the target promoter 110. Subsequently, the computing device 130 may acquire a group of candidate objects matching the preference object category from the set of objects.

Taking the live streaming sales as an example, the computing device 130 may determine a preference product category of the target live streamer according to products that have previously advertised by the target live streamer, and recall products matching the product category from a product library as candidate products.

In some embodiments, the computing device 130 may utilize a popular recall policy for recall. Specifically, the computing device 130 may determine a group of candidate objects with a popularity exceeding a threshold, where the popularity indicates a degree to which an object is concerned by a user.

Taking the live streaming sales as an example, the computing device 130 may recall products with the highest sales volume, products with the highest number of clicks, or products that have been added to shopping carts the most times within a predetermined period of time on the platform as candidate products. It should be understood that such popularity may be determined based on, for example, a number of times that a product has been viewed, a number of products that have been added to shopping carts, a number of times that a product has been sold, and a number of live streamers who have promoted a product.

In some embodiments, the computing device 130 may utilize an operation configuration policy for recall. Specifically, the computing device 130 may acquire a group of pre-configured candidate objects.

Taking the live streaming sales as an example, an operator may pre-configure a group of products, and the computing device 130 may select all or part of the products from the group of products as candidate products.

At block 304, the computing device 130 may select, from the plurality groups of candidate objects, the plurality of candidate objects 150.

In some embodiments, because a number of target objects ultimately provided to the target promoter 110 is usually limited, the computing device 130, for example, may select the plurality of candidate objects 150 from the plurality groups of candidate objects to reduce computational burden.

In some embodiments, in order to ensure the variety of recall results, the computing device 130 may use snake-shaped merging to select up to a predetermined number of candidate objects 150 from the plurality groups of candidate objects.

For example, when using 4 recall policies to acquire 4 groups of candidate objects, the computing device 130 may select one candidate object from the 4 groups of candidate objects to serve as a plurality of recalled candidate objects 150.

In some embodiments, considering that the results of different recall policies may have duplications, the computing device 130, for example, may cause at most a threshold number of candidate objects in each group of candidate objects to be included in the plurality of selected candidate objects 150.

In some embodiments, a proportion of candidate objects acquired based on different recall policies among the plurality of candidate objects 150 may be different. For example, candidate objects acquired based on FFM recall policies may be included more in the plurality of candidate objects 150.

In some embodiments, the computing device 130 may further filter the objects acquired from the recall. Specifically, the computing device 130 may acquire the plurality of candidate objects by excluding an abnormal object from the plurality groups of candidate objects. The abnormal object comprises at least one of the following: an object that is currently unavailable to a user, an object with an acquisition cost deviating from a predetermined scope, an object with an evaluation that is below a predetermined level, an object that has been acquired for a number of times that is below a predetermined threshold, and an object provided by a provider that has been in violation.

Taking the live streaming sales as an example, the computing device 130 may exclude a product with an abnormal price, an off-the-shelf product, a sold-out product, a product with low user reviews, a product with low sales during a predetermined period of time, or a product provided by a merchant who has committed violations (for example, click farming) from recalled products. It should be understood that the abnormal product may also be defined based on other appropriate rules.

The process of recalling the plurality of candidate objects 150 from the set of objects 145 is introduced above. Continuing with reference to FIG. 2, at block 204, the computing device 130 determines, based on the first feature 120 of the target promoter 110 and second features 140 of the plurality of candidate objects 150, the priority levels of the plurality of candidate objects 150.

In some embodiments, the first feature may represent a user attribute of a first group of associated users associated with the target promoter 110. The second feature may represent a user attribute of a second group of associated users associated with the candidate object. The second group of associated users have acquired the candidate object within a predetermined period of time. Such user attributes aim to describe relevant characteristics of users associated with the target promoter or the candidate objects.

In some embodiments, the first feature may represent first statistical information associated with the target promoter 110. The second feature may represent second statistical information associated with the candidate object 150. At least one of the first statistical information and the second statistical information is updated in real-time or periodically in response to a user operation.

Taking the live streaming sales as an example, the first statistical information may also include some real-time updated data, for example a total sales volume of the target live streamer, a number of followers, and so on. The computing device 130, for example, may utilize a predetermined event tracking point to enable a specific user operation to trigger real-time updates of the first statistical information.

On the other hand, the first statistical information, for example, may be updated periodically. For example, the first statistical information may indicate sales volume of the candidate live streamer in the past 30 days, a number of new followers in the past 30 days, and so on. Such first statistical information, for example, may be updated regularly by the platform on a daily basis.

Correspondingly, the second statistical information associated with the product, for example, may include real-time updated data, such as sales revenue of the product, a number of positive user reviews of the product, a number of negative user reviews of the product, a number of views of the product, a number of times that the product was added to a shopping cart, and so on. The computing device 130 may utilize, for example, a predetermined event tracking point to enable a specific user operation to trigger real-time updates of the second statistical information.

On the other hand, the second statistical information, for example, may also be updated periodically. For example, the second statistical information may indicate sales revenue of the candidate product in the past 30 days, a total number of user reviews in the past 30 days, and so on. Such statistical information, for example, may be updated regularly by the platform on a daily basis.

In some embodiments, the first feature may represent a first attribute of a historical object acquired by a user through being guided by the target promoter within a first period of time. The second feature may represent a second attribute of a historical promoter that published a guidance content for guiding to acquire the candidate object within a second period of time.

For example, the first attribute includes an acquisition statistic of the historical object during the first period of time, an acquisition cost of the historical object, and a category to which the historical object belongs or a combination thereof.

Taking the live streaming sales as an example, the first attribute may include sales volume of a historical product that were previously advertised by the live streamer, a price of the historical product, or a category of the historical product.

Taking the live streaming sales as an example, the second attribute may include attribute information of a historical live streamer who has promoted the candidate product.

The specific information that may represented by the first feature 120 and the second features 140 is discussed above. In some embodiments, in order to determine the priority levels, the computing device 130 may generate input features based on a first feature representation of the first feature 120 and a second feature representation of the second features 140.

In some embodiments, the computing device 130, for example, may cascade the first feature representation and the second feature representation to acquire the input features. Such feature representations may include a feature part corresponding to the user attribute of an associated user, a feature parts corresponding to the statistical information, and/or a feature part corresponding to historical promotion information. Based on this approach, the target promoter 110 and the plurality of candidate objects 150 may be characterized more comprehensively.

Furthermore, the computing device 130 may utilize a priority model to process the input features to determine the priority levels. The priority model is trained based on historical guidance information of a group of training promoters for a group of training objects. Taking the live streamer sales as an example, such historical guidance information may include, for example, a click through rate, a purchase rate, an add-to-shopping cart rate, or the like of a product advertised by the live streamer.

In some embodiments, the computing device 130 may acquire a trained priority model. Such a priority model may be implemented through an appropriate machine learning model (for example, a deep neural network). It should be understood that the priority model may be trained by a same training device as the computing device 130 or a different training device from the computing device 130.

During the training process, a training device may acquire a group of training providers and a group of training promoters, and construct a plurality of provider-promoter sample pairs. For each sample pair, the training device may determine the input features input to the model based on the aforementioned methods, and train the priority model based on a true value of the model training. Whether the provider-promoter have previously cooperated serves as the true value (for example, 1 may indicate that the provider-promoter have cooperated, 0 may indicate that the provider-promoter have not cooperated).

After this training process, the trained priority model can receive the input features and input a probability of 0-1 to represent a probability that a user who has viewed the guidance content is interested in the candidate objects 150. Such a probability, for example, may be determined as the priority levels of the candidate objects. By training the priority model, a product that has a higher probability of being clicked, purchased, or adding to a shopping cart by followers of a live streamer may be given a higher priority level.

Reference is still made to FIG. 2, at block 206, the computing device 130 determines, based on the priority levels, a target object for the target promoter from the plurality of candidate objects.

In some embodiments, the computing device 130 may select a candidate object with a priority level exceeding a threshold level from the plurality of candidate objects 150 as a target object. Alternatively, the computing device 130 may also select a predetermined number of target objects with higher priority levels based on a ranking of priority levels.

In some embodiments, before sorting to finally obtain the target object, the computing device 130 may also adjust priority level(s) of at least one candidate object, and determine the target object based on the adjusted priority level(s).

In some embodiments, the computing device 130 may adjust, based on an expected promotional benefit of the at least one candidate object, the priority level of the at least one candidate object.

Taking a live streamer sales as an example, a merchant may assign different advertised benefits for different products. For example, the computing device 130 may determine an expected sales benefit of a product based on its sales volume and an advertised benefit of a single item within a predetermined period of time in the past. Furthermore, the computing device 130 may increase the priority level of a product with a higher advertised benefit.

In some embodiments, the computing device 130 may adjust, based on popularity of the at least one candidate object, the priority level of the at least one candidate object, the popularity indicating a degree to which the at least one candidate object is concerned by a user.

Taking the live streamer sales as an example, the computing device 130 may, for example, increase the priority level of a popular product. Such a popular product may include a product with a higher purchase volume, a product with higher user clicks, a product with a higher number of times of being added to a shopping cart, or a product with a higher number of times of being advertised by a live streamer.

In some embodiments, the computing device 130 may adjust, based on evaluation information of the at least one candidate object, the priority level of the at least one candidate object.

Taking the live streamer sales as an example, the computing device 130, for example, may increase the priority level of a product with a higher rate of positive reviews and reduce the priority level of a product with a higher rate of negative reviews.

In some embodiments, the computing device 130 may reduce the priority level of the at least one candidate object, if the at least one candidate object is provided to the target promoter within a predetermined period of time and is not selected by the target promoter.

Taking the live streamer sales as an example, the computing device 130 may present a certain product to users multiple times within a period of time in the past, however the live streamer has not selected the product for promotion. It may indicate a high probability that the live streamer may be not interested in the product, therefore the priority level of such a product may be reduced.

In some embodiments, a degree by which the priority level is reduced is determined based on viewing information of the at least one candidate object, and the viewing information comprises viewing times or viewing duration.

Taking the live streamer sales as an example, the computing device 130 may reduce the priority level accordingly based on the number of times and/or a duration that a candidate product has been presented to a live streamer on a page of products to be advertised within a predetermined period of time in the past. For example, the higher the number of times or the longer the duration, the greater the extent of the priority level may be reduced. Based on this approach, the computing device 130 may reduce the priority level of a product that the live streamer is not interested in.

Furthermore, the computing device 130 may select the target promoter based on the adjusted priority level.

In some embodiments, the computing device 130 may present information associated with the target object to the target promoter 110. For example, the computing device 130 may send information associated with the target object to the target promoter. For example, such information may include a description of the target object.

Taking the live streaming sales as an example, the computing device 130 may provide information of a determined target product to the target live streamer, for example a name, a price, recent sales volume, a merchant name, merchant contact information, and so on of the product. Such information may help the target live streamer understand the characteristics of the target product more conveniently, thereby promoting the target live streamer to choose the target product for promotion.

In some embodiments, the target object comprises a first object and a second object. The priority level of the first object is higher than the priority level of the second object. Correspondingly, first information associated with the first object may have a higher presentation priority than second information associated with the second object.

For example, the computing device 130 may present information of a plurality of target promoters through a list, and enable information of target objects with higher priority levels to be presented at the upper end of the list. It should be understood that the first information may be more prominently presented through other appropriate means.

In some embodiments, the target object comprises a plurality of target objects. The information of the plurality of target objects is implemented as a plurality of information items in an object information list. The plurality of information items are ranked in the object information list according to the priority levels.

Taking the target object including products as an example, the computing device 130 may present a list of products to the target live streamer through a screen of a terminal device. A product with a higher priority may be displayed at an upper position in the list.

In some embodiments, the computing device 130 may determine, from the object information list, a group of information items in consecutive positions. The group of information items correspond to a first category of objects, and a number of information items contained in the group of information items is greater than a threshold. Subsequently, the computing device 130 may replace at least one information item in the group of information items with an information item corresponding to a second category of object in the object information list. The first category is different from the second category.

Taking the target object including products as an example, the computing device 130 may determine whether there are a plurality of consecutive products belonging to a same category in a product list. For example, if products ranked from 1 to 5 are all belong to a clothing category according to the priority level, in order to enrich the variety of results, the computing device 130 may replace at least one of the clothing products originally ranked from 1 to 5 with a product from another category (for example, cosmetics), so that the top five products presented in priority include at least two categories of products.

It should be understood that any attribute or feature mentioned above that involves a live streamer, a merchant, a user, or a follower should be acquired with permission from corresponding subjects.

Based on the process discussed above, the embodiments of the present disclosure may utilize feature engineering to determine the priority levels based on the plurality of candidate objects initially recalled, and thus can determine a suitable target object for a target promoter more accurately, thereby increasing the probability of the promoter promoting the target object.

Figure 4:
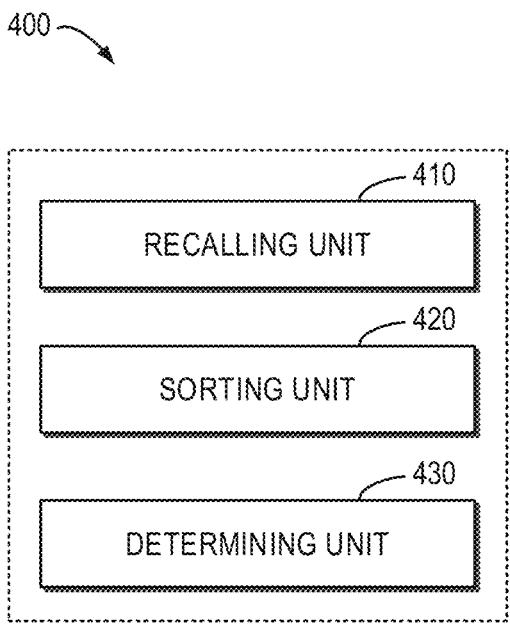
FIG. 4 shows a schematic structural block diagram of an apparatus for object determination according to some embodiments of the present disclosure.

The embodiments of the present disclosure further provide a corresponding apparatus for implementing the above methods or processes. FIG. 4 shows a schematic structural block diagram of an apparatus 400 for object determination according to some embodiments of the present disclosure.

As shown in FIG. 4, the apparatus 400 may include a recalling unit 410 configured to recall, from a set of objects, a plurality of candidate objects for a target promoter. The promoter is capable of publishing a guidance content for guiding a user to acquire a corresponding object. The apparatus 400 further includes a sorting unit 420 configured to determine, based on a first feature of the target promoter and second features of the plurality of candidate objects, priority levels of the plurality of candidate objects. The apparatus 400 further includes a determining unit 430 configured to determine, based on the priority levels, a target object for the target promoter from the plurality of candidate objects.

In some embodiments, the recalling unit 410 is further configured to determine, from the set of objects, a plurality groups of candidate objects corresponding to a plurality of recall policies; and select, from the plurality groups of candidate objects, the plurality of candidate objects.

In some embodiments, the plurality of recalling policies include a Field-aware Factorization Machines FFM recall policy, and the recalling unit 410 may be further configured to determine a first field vector of the target promoter and a second field vector of the set of objects; and determine a group of candidate objects base on a distance between the first field vector and the second field vector.

In some embodiments, the plurality of recall policies comprises a collaborative recall policy, and the recalling unit 410 may be further configured to determine, based on a historical guidance content published by the target promoter, a historical object associated with the target promoter; and acquire, from the set of objects, a group of candidate objects whose differences from the historical object are less than a predetermined threshold.

In some embodiments, a difference between the historical object and a specific object in the set of objects is determined based on the number of users that acquired both the historical object and the specific object within a predetermined period of time.

In some embodiments, the plurality of recall policies comprise a contact establishment recall policy, and the recalling unit 410 may be further configured to determine, based on historical contact information of the target promoter, a historical provider that has previously been contacted by the target promoter. The historical provider may provide at least one object that is accessible to a user. The recalling unit 410 may be further configured to determine a group of candidate providers based on the historical provider. The group of candidate providers include the historical provider and an associated provider whose difference from the historical provider is less than a predetermined threshold. The recalling unit 410 may be further configured to determine an object that is currently provided by the group of candidate providers as a group of candidate objects.

In some embodiments, the plurality of recall policies comprise a preference recall policy, and the recalling unit 410 may be further configured to determine a preference object category of the target promoter based on the historical guidance content published by the target promoter; and acquire a group of candidate objects matching the preference object category from the set of objects.

In some embodiments, the plurality of recall policies comprise a popularity recall policy, and the recalling unit 410 may be further configured to determine a group of candidate objects with a popularity exceeding a threshold. The popularity indicates a degree to which an object is concerned by a user.

In some embodiments, the plurality of recall policies comprise an operation configuration recall policy, and the recalling unit 410 may be further configured to acquire a group of pre-configured candidate objects.

In some embodiments, at most a threshold number of candidate objects in each group are included in the selected plurality of candidate objects.

In some embodiments, the recalling unit 410 may be further configured to acquire the plurality of candidate objects by excluding an abnormal object from the plurality groups of candidate objects. The abnormal object comprises at least one of the following: an object that is currently unavailable to a user and an object with an acquisition cost deviating from a predetermined scope.

In some embodiments, the recalling unit 410 may be further configured to acquire the plurality of candidate objects by excluding an abnormal object from the plurality groups of candidate objects. The abnormal object comprises at least one of the following: an object that is currently unavailable to a user, an object with an acquisition cost deviating from a predetermined scope, an object with an evaluation that is below a predetermined level, an object that has been acquired for a number of times that is below a predetermined threshold, and an object provided by a provider that has been in violation.

In some embodiments, the first feature represents a user attribute of a first group of associated users associated with the target promoter. The second feature represents a user attribute of a second group of associated users associated with the candidate object. The second group of associated users have acquired the candidate object within a predetermined period of time.

In some embodiments, the first feature represents first statistical information associated with the target promoter. The second feature represents second statistical information associated with the candidate object. At least one of the first statistical information and the second statistical information is updated in real-time or periodically in response to a user operation.

In some embodiments, the first feature represents a first attribute of a historical object acquired by a user through being guided by the target promoter within a first period of time. The second feature represents a second attribute of a historical promoter that published a guidance content for guiding to acquire the candidate object within a second period of time.

In some embodiments, the first attribute comprises at least one of the following: an acquisition statistic of the historical object during the first period of time, an acquisition cost of the historical object, and a category to which the historical object belongs.

In some embodiments, the sorting unit 420 may be further configured to generate input features based on a first feature representation of the first feature and a second feature representation of the second feature; and process the input features using a priority model to determine a priority level. The priority model is trained based the historical guidance information of a group of training promoters for a group of training objects.

In some embodiments, the determining unit 430 may be further configured to adjust the priority level of at least one of the plurality of candidate objects; and determine, based on the adjusted priority level, the target object.

In some embodiments, the determining unit 430 may be further configured to adjust, based on an expected promotional benefit of the at least one candidate object, the priority level of the at least one candidate object.

In some embodiments, the determining unit 430 may be further configured to adjust, based on popularity of the at least one candidate object, the priority level of the at least one candidate object. The popularity indicates a degree to which the at least one candidate object is concerned by a user.

In some embodiments, the determining unit 430 may be further configured to adjust, based on evaluation information of the at least one candidate object, the priority level of the at least one candidate object.

In some embodiments, the determining unit 430 may be further configured to reduce the priority level of the at least one candidate object, if the at least one candidate object is provided to the target promoter within a predetermined period of time and is not selected by the target promoter.

In some embodiments, a degree by which the priority level is reduced is determined based on viewing information of the at least one candidate object. The viewing information comprises viewing times or viewing duration.

In some embodiments, the apparatus 400 further includes a providing unit configured to present, to the target promoter, information associated with the target object, In some embodiments, the target object comprises a first object and a second object. The priority level of the first object is higher than the priority level of the second object, and first information associated with the first object has a higher presentation priority than second information associated with the second object.

In some embodiments, the target object comprises a plurality of target objects. The information of the plurality of target objects is presented as a plurality of information items in an object information list. The plurality of information items are ranked in the object information list according to the priority levels.

In some embodiments, the providing module may be further configured to determine, from the object information list, a group of information items in consecutive positions. The group of information items correspond to a first category of objects, and a number of information items contained in the group of information items is greater than a threshold. The providing module may be further configured to replace at least one information item in the group of information items with an information item corresponding to a second category of object in the object information list. The first category is different from the second category.

The units included in the apparatus 400 may be implemented in various ways, including software, hardware, firmware, or any combination thereof. In some embodiments, one or more units may be implemented using software and/or firmware, for example machine executable instructions stored on a storage medium. In addition to machine executable instructions or as an alternative, some or all units in the apparatus 400 may be implemented at least partially by one or more hardware logic components. As an example, rather than a limitation, example types of hardware logic components that can be used include field programmable gate array (FPGA), application specific integrated circuit (ASIC), application specific standard (ASSP), system on chip (SOC), complex programmable logic device (CPLD), and so on.

Figure 5:
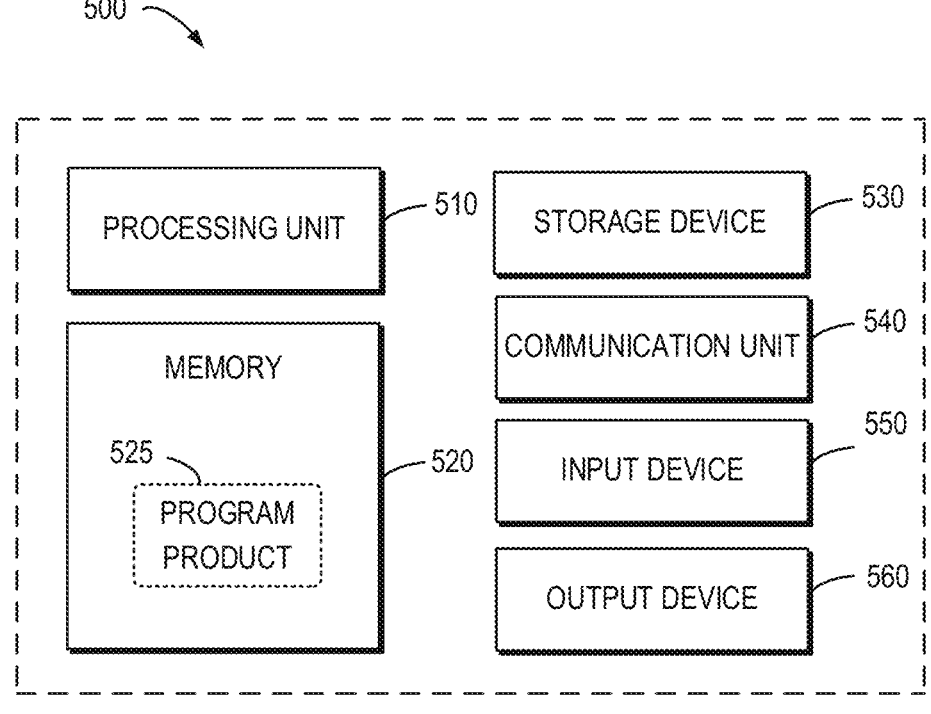
FIG. 5 shows a block diagram of a computing device capable of implementing multiple embodiments of the present disclosure.

FIG. 5 shows a block diagram of a computing device/server 500 in which one or more embodiments of the present disclosure may be implemented. It should be understood that the computing device/server 500 shown in FIG. 5 is only an example and should not constitute any limitation on the functionality and scope of the embodiments described herein.

As shown in FIG. 5, the computing device/server 500 is in the form of a general computing device. The components of computing device/server 500 may include, but are not limited to, one or more processors or processing units 510, a memory 520, a storage device 530, one or more communication units 540, one or more input devices 550, and one or more output devices 560. The processing unit 510 may be an actual or virtual processor and can execute various processes based on the programs stored in the memory 520. In a multiprocessor system, multiple processing units execute computer executable instructions in parallel to improve the parallel processing capability of the computing device/server 500.

The computing device/server 500 typically includes multiple computer storage medium. Such medium may be any available medium that is accessible to the computing device/server 500, including but not limited to volatile and non-volatile medium, removable and non-removable medium. The memory 520 may be volatile memory (for example, a register, cache, a random access memory (RAM)), a non-volatile memory (for example, a read-only memory (ROM), an electrically erasable programmable read-only memory (EEPROM), a flash memory), or any combination thereof. The storage device 530 may be any removable or non-removable medium, and may include a machine readable medium such as a flash drive, a disk, or any other medium, which can be used to store information and/or data (such as training data for training) and can be accessed within the computing device/server 500.

The computing device/system 500 may further include additional removable/non-removable, volatile/non-volatile storage medium. Although not shown in FIG. 5, a disk driver for reading from or writing to a removable, non-volatile disk (such as a "floppy disk"), and an optical disk driver for reading from or writing to a removable, non-volatile optical disk can be provided. In these cases, each driver may be connected to the bus (not shown) by one or more data medium interfaces. The memory 520 may include a computer program product 525, which has one or more program modules configured to perform various methods or acts of various embodiments of the present disclosure.

The communication unit 540 communicates with a further computing device through the communication medium. In addition, functions of components in the computing device/system 500 may be implemented by a single computing cluster or multiple computing machines, which can communicate through a communication connection. Therefore, the computing device/system 500 may be operated in a networking environment using a logical connection with one or more other servers, a network personal computer (PC), or another network node.

The input device 550 may be one or more input devices, such as a mouse, a keyboard, a trackball, and so on. The output device 560 may be one or more output devices, such as a display, a speaker, a printer, and so on. The computing device/system 500 may further communicate with one or more external devices (not shown) through the communication unit 540 as required. The external device, such as a storage device, a display device, and so on, communicate with one or more devices that enable users to interact with the computing device/system 500, or communicate with any device (for example, a network card, a modem, and so on) that makes the computing device/system 500 communicate with one or more other computing devices. Such communication may be executed via an input/output (I/O) interface (not shown).

According to example implementation of the present disclosure, a computer-readable storage medium is provided, on which a computer-executable instruction or computer program is stored, wherein the computer-executable instructions or the computer program is executed by the processor to implement the method described above.

Various aspects of the present disclosure are described herein with reference to the flow chart and/or the block diagram of the method, the apparatus (system) and the computer program product implemented in accordance with the present disclosure. It would be appreciated that each block of the flowchart and/or the block diagram and the combination of each block in the flowchart and/or the block diagram may be implemented by computer-readable program instructions.

These computer-readable program instructions may be provided to the processing units of general-purpose computers, specialized computers or other programmable data processing devices to produce a machine that generates an apparatus to implement the functions/actions specified in one or more blocks in the flow chart and/or the block diagram when these instructions are executed through the computer or other programmable data processing apparatuses. These computer-readable program instructions may also be stored in a computer-readable storage medium. These instructions enable a computer, a programmable data processing apparatus and/or other devices to work in a specific way. Therefore, the computer-readable medium containing the instructions includes a product, which includes instructions to implement various aspects of the functions/actions specified in one or more blocks in the flowchart and/or the block diagram.

The computer-readable program instructions may be loaded onto a computer, other programmable data processing apparatus, or other devices, so that a series of operational steps can be performed on a computer, other programmable data processing apparatus, or other devices, to generate a computer-implemented process, such that the instructions which execute on a computer, other programmable data processing apparatuses, or other devices implement the functions/acts specified in one or more blocks in the flowchart and/or the block diagram.

The flowchart and the block diagram in the drawings show the possible architecture, functions and operations of the system, the method and the computer program product implemented in accordance with the present disclosure. In this regard, each block in the flowchart or the block diagram may represent a part of a module, a program segment or instructions, which contains one or more executable instructions for implementing the specified logic function. In some alternative implementations, the functions marked in the block may also occur in a different order from those marked in the drawings. For example, two consecutive blocks may actually be executed in parallel, and sometimes can also be executed in a reverse order, depending on the function involved. It should also be noted that each block in the block diagram and/or the flowchart, and combinations of blocks in the block diagram and/or the flowchart, may be implemented by a dedicated hardware-based system that performs the specified functions or acts, or by the combination of dedicated hardware and computer instructions.

Each implementation of the present disclosure has been described above. The above description is exemplary, not exhaustive, and is not limited to the disclosed implementations. Without departing from the scope and spirit of the described implementations, many modifications and changes are obvious to ordinary skill in the art. The selection of terms used in this article aims to best explain the principles, practical application or improvement of technology in the market of each implementation, or to enable other ordinary skill in the art to understand the various embodiments disclosed herein.

What is claimed is:

1. A computer-implemented method for object determination in a content promotion platform, comprising:

recalling, from a set of objects, a plurality of candidate objects for a target promoter, the promoter being capable of publishing a live streaming guidance content for guiding a user to acquire a corresponding object;

determining, based on a first feature of the target promoter and second features of the plurality of candidate objects, priority levels of the plurality of candidate objects, wherein the priority levels are determined by a machine learning priority model trained to predict suitability of each candidate object for promotion by the target promoter based on the first feature and the second feature;

determining, based on the priority levels, a target object for the target promoter from the plurality of candidate objects; and presenting, via a user interface, a ranked list of information associated with one or more target objects for the target promoter to select for inclusion in the live streaming guidance content.

2. The method of claim 1, wherein recalling, from the set of objects, the plurality of candidate objects for the target promoter comprises:

determining, from the set of objects, a plurality groups of candidate objects corresponding to a plurality of recall policies; and selecting, from the plurality groups of candidate objects, the plurality of candidate objects.

3. The method of claim 2, wherein the plurality of recall policies comprises a collaborative recall policy, and determining the plurality groups of candidate objects corresponding to the plurality of recall policies comprises:

determining, based on a historical guidance content published by the target promoter, a historical object associated with the target promoter; and acquiring, from the set of objects, a group of candidate objects whose differences from the historical object are less than a predetermined threshold, wherein a difference between the historical object and a specific object in the set of objects is determined based on the number of users that acquired both the historical object and the specific object within a predetermined period of time.

4. The method of claim 2, wherein selecting, from the plurality groups of candidate objects, the plurality of candidate objects comprises:

acquiring the plurality of candidate objects by excluding an abnormal object from the plurality groups of candidate objects, wherein the abnormal object comprises at least one of the following:

an object that is currently unavailable to a user, an object with an acquisition cost deviating from a predetermined scope, an object with an evaluation that is below a predetermined level, an object that has been acquired for a number of times that is below a predetermined threshold, and an object provided by a provider that has been in violation.

5. The method of claim 1, wherein the first feature represents a user attribute of a first group of associated users associated with the target promoter, the second feature represents a user attribute of a second group of associated users associated with the candidate object, the second group of associated users have acquired the candidate object within a predetermined period of time.

6. The method of claim 1, wherein the first feature represents first statistical information associated with the target promoter, the second feature represents second statistical information associated with the candidate object, at least one of the first statistical information and the second statistical information is updated in real-time or periodically in response to a user operation.

7. The method of claim 1, wherein the first feature represents a first attribute of a historical object acquired by a user through being guided by the target promoter within a first period of time, the second feature represents a second attribute of a historical promoter that published a guidance content for guiding to acquire the candidate object within a second period of time.

8. The method of claim 1, wherein determining the target object for the target promoter from the plurality of candidate objects comprises:

adjusting the priority level of at least one of the plurality of candidate objects; and determining, based on the adjusted priority level, the target object.

9. The method of claim 8, wherein adjusting the priority level of at least one of the plurality of candidate objects comprises:

adjusting, based on an expected promotional benefit of the at least one candidate object, the priority level of the at least one candidate object.

10. The method of claim 8, wherein adjusting the priority level of at least one of the plurality of candidate objects comprises:

adjusting, based on popularity of the at least one candidate object, the priority level of the at least one candidate object, the popularity indicating a degree to which the at least one candidate object is concerned by a user.

11. The method of claim 8, wherein adjusting the priority level of at least one of the plurality of candidate objects comprises:

adjusting, based on evaluation information of the at least one candidate object, the priority level of the at least one candidate object.

12. The method of claim 8, wherein adjusting the priority level of at least one of the plurality of candidate objects comprises:

reducing the priority level of the at least one candidate object, if the at least one candidate object is provided to the target promoter within a predetermined period of time and is not selected by the target promoter.

13. The method of claim 12, wherein a degree by which the priority level is reduced is determined based on viewing information of the at least one candidate object, the viewing information comprises viewing times or viewing duration.

14. The method of claim 1, wherein the target object comprises a first object and a second object, the priority level of the first object is higher than the priority level of the second object, and first information associated with the first object has a higher presentation priority than second information associated with the second object.

15. The method of claim 14, wherein the target object comprises a plurality of target objects, the information of the plurality of target objects is presented as a plurality of information items in an object information list, the plurality of information items are ranked in the object information list according to the priority levels.

16. The method of claim 15, further comprising:

determining, from the object information list, a group of information items in consecutive positions, the group of information items corresponding to a first category of objects, and a number of information items contained in the group of information items being greater than a threshold; and replacing at least one information item in the group of information items with an information item corresponding to a second category of object in the object information list, the first category being different from the second category.

17. An electronic device, comprising:

a memory and a processor;

wherein the memory is used to store one or more computer instructions, and the one or more computer instructions are executed by the processor to implement a computer-implemented method for object determination in a content promotion platform, the method comprising:

recalling, from a set of objects, a plurality of candidate objects for a target promoter, the promoter being capable of publishing a live streaming guidance content for guiding a user to acquire a corresponding object;

determining, based on a first feature of the target promoter and second features of the plurality of candidate objects, priority levels of the plurality of candidate objects, wherein the priority levels are determined by a machine learning priority model trained to predict suitability of each candidate object for promotion by the target promoter based on the first feature and the second feature;

determining, based on the priority levels, a target object for the target promoter from the plurality of candidate objects; and presenting, via a user interface, a ranked list of information associated with one or more target objects for the target promoter to select for inclusion in the live streaming guidance content.

18. The electronic device of claim 17, wherein recalling, from the set of objects, the plurality of candidate objects for the target promoter comprises:

determining, from the set of objects, a plurality groups of candidate objects corresponding to a plurality of recall policies; and selecting, from the plurality groups of candidate objects, the plurality of candidate objects.

19. The electronic device of claim 18, wherein the plurality of recall policies comprises a collaborative recall policy, and determining the plurality groups of candidate objects corresponding to the plurality of recall policies comprises:

determining, based on a historical guidance content published by the target promoter, a historical object associated with the target promoter; and acquiring, from the set of objects, a group of candidate objects whose differences from the historical object are less than a predetermined threshold, wherein a difference between the historical object and a specific object in the set of objects is determined based on the number of users that acquired both the historical object and the specific object within a predetermined period of time.

20. A non-transitory computer-readable storage medium, storing thereon one or more computer instructions, wherein the one more computer instructions are executed by a processor to implement a computer-implemented method for object determination in a content promotion platform, the method comprising:

recalling, from a set of objects, a plurality of candidate objects for a target promoter, the promoter being capable of publishing a live streaming guidance content for guiding a user to acquire a corresponding object;

determining, based on a first feature of the target promoter and second features of the plurality of candidate objects, priority levels of the plurality of candidate objects, wherein the priority levels are determined by a machine learning priority model trained to predict suitability of each candidate object for promotion by the target promoter based on the first feature and the second feature; determining, based on the priority levels, a target object for the target promoter from the plurality of candidate objects; and presenting, via a user interface, a ranked list of information associated with one or more target objects for the target promoter to select for inclusion in the live streaming guidance content.

* * * * *